United States Patent Office 2,931,816
Patented Apr. 5, 1960

2,931,816

NEW SERIES OF ORGANIC COMPOUNDS

Werner Richard Boehme, Somerville, N.J., assignor to Ethicon, Inc., a corporation of New Jersey No Drawing. Application November 8, 1957
Serial No. 695,217

10 Claims. (Cl. 260—346.2)

This invention relates to a new series of organic compounds. More particularly, the present invention is concerned with 1-RO-3-R'O-4,7-endomethylene-hexahydrophthalans, the corresponding tetrahydrophthalans and methods for their preparation.

The compounds of this invention may be represented by the following general structural formula:

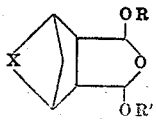

wherein X is an ethylene or vinylene group and R and R' are, interchangeably, alkyl, especially lower alkyl, aralkyl, or acyl groups. Examples of suitable alkyl substituents are: methyl, ethyl, propyl, isopropyl, butyl, isobutyl, pentyl, isopentyl, hexyl, isohexyl, etc. Examples of aralkyl radicals are benzyl, phenethyl, p-methoxybenzyl, etc. Acyl radicals represented by R and R' above may be those of aromatic, aliphatic, heterocyclic, aliphatic carboxylic or sulfonic acids, e.g. a lower fatty acid such as acetic, propionic, butyric, chloracetic or methoxyacetic; a phenyl carboxylic acid such as an alkoxyphenyl-carboxylic acid, e.g. 4-methoxy benzoic; 3,4-methylenedioxy-benzoic; 3,4-diethoxybenzoic; syringic; an alkoxyphenyl aliphatic carboxylic acid, such as an alkoxy cinnamic acid, e.g. methoxy cinnamic acid or ethoxycinnamic acid; a pyridine carboxylic acid such as nicotinic or isonicotinic acid; a thiophene carboxylic acid such as thiophene-2-carboxylic acid; or an arylsulfonic acid such as benzenesulfonic acid or p-toluenesulfonic acid.

The hexahydro- and tetrahydrophthalans of this invention are miscible with alcohol and hydroalcoholic mixtures, and are non-irritating. They possess pleasant odors and, for this reason, lend themselves to use as ingredients in perfume, cologne and scented cosmetic formulations, for example in cold creams, vanishing creams, astringent lotions, hand lotions, etc. in quantities ranging from about 0.5% to about 20%.

The tetrahydrophthalans of this invention may be prepared by condensing cyclopentadiene or dicyclopentadiene with a 2-RO-5-R'O-2,5-dihydrofuran, and, if desired, converting the product so obtained to the corresponding hexahydrophthalan by catalytic hydrogenation. The R and R' substituents in the 2,5 positions of the dihydrofuran starting material may be, interchangeably, alkyl, aralkyl or acyl groups such as one of those defined hereinabove.

The condensation may be carried out in the presence or absence of an organic solvent. Suitable solvents for such purpose are the liquid hydrocarbons having a boiling point in excess of 70° C., such as for example, toluene, benzene, xylene, kerosene, dioxane, chlorbenzene, dichlorobenzene, carbon tetrachloride, etc. The reaction is conducted at room temperature or, preferably, at elevated temperature, i.e. from about 100° C. to about 200° C., at atmospheric pressure, or, preferably, in a closed vessel under pressure and, if desired, in the presence of an inert gas, e.g. nitrogen.

Hydrogenation of the tetrahydrophthalans to the corresponding hexahydrophthalans is preferably carried out by catalytic means, that is to say with hydrogen in the presence of a catalyst selected from the metals of the eighth group of the periodic system, such as nickel, for example, Raney nickel; palladium, platinum or rhodium. They may be employed on carriers such as barium carbonate, kieselguhr or charcoal, in the form of special preparations such as palladium black, or preferably as oxides, such as platinum oxide. The reduction is most advantageously carried out in the presence of a solvent such as a lower alkanol, for example methanol or ethanol and, if so desired, under pressure.

The starting materials used in the preparation of the compounds of this invention are known or may be prepared by methods known to those skilled in the art. In a general way, the 2,5-dialkoxy-2,5-dihydrofurans are prepared by electrolysis of furan in an appropriate alcohol, i.e. lower alkanol in the presence of an electrolyte such as sulfuric acid or ammonium bromide. Alternatively, these starting materials may be prepared by reacting furan at low temperature in a solution of a lower alkanol with a halogen such as bromine or chlorine. The 2,5-diacyloxy-2,5-dihydrofuran starting materials may be prepared by treating furan with bromine in the presence of an appropriate acid, i.e. one of those referred to hereinabove or with a tetravalent lead salt of the appropriate acid, such as lead tetraacetate. The directions for preparing various 2,5-dialkoxy-2,5-dihydrofurans and 2,5-diacyloxy-2,5-dihydrofurans are available in the literature, for example in United States Patent 2,714,576 to Clauson-Kaas (dialkoxy) and in Act. Chem. Scand. 1, 379–81 (1947), and Kgl. Danske. Videnskab. Selskab. Mat. fys. Medd. 24, #6, 18 pp. (1947) (diacyloxy).

The following examples are submitted as being illustrative of the invention, but are not intended to be limitative on its scope.

*Example I*

A solution of 55 parts by weight of freshly distilled cyclopentadiene, 87 parts by weight of 2,5-dimethoxy-2,5-dihydrofuran and 0.2 part by weight of hydroquinone in 50 parts by volume of dry toluene is heated in a sealed tube at 170° C. for 24 hours. The reaction product is fractionated twice under reduced pressure to yield 82.5 parts by weight of 1,3-dimethoxy-4,7-endomethylene-4,7,8,9-tetrahydrophthalan, a colorless liquid boiling at 116–118° C./10 mm., $n_D^{27}$ 1.4802.

*Example II*

19.6 parts by weight of 1,3-dimethoxy-4,7-endomethylene-4,7,8,9-tetrahydrophthalan is hydrogenated in 100 parts by volume of 95% ethanol at 50 pounds initial hydrogen pressure in the presence of palladium oxide. Fractionation through a Vigreux column after removal of the catalyst gives 15.0 parts by weight of 1,3-dimethoxy-4,7-endomethylenehexahydrophthalan, a colorless liquid, B.P. 121–122° C./11 mm., $n_D^{25}$ 1.4764.

Example III

A solution of 25.9 parts by weight of 2,5-diethoxy-2,5-dihydrofuran, 54.2 parts by weight of dicyclopentadiene and 1 part by weight of hydroquinone is heated for 24 hours at 160° C. in a sealed glass tube. After cooling, the yellow liquid is distilled to give 1,3-diethoxy-4,7-endomethylene-4,7,8,9-tetrahydrophthalan which boils at 86-87° C./0.7-0.8 mm., $n_D^{25}$ 1.4760.

Example IV

A mixture of 7.9 parts by weight of 2,5-diisopropoxy-2,5-dihydrofuran, 5.3 parts by volume of cyclopentadiene and 0.10 part by weight of hydroquinone is heated in a sealed tube at 160° C. for a period of 24 hours. The resulting liquid is distilled to give 1,3-diisopropoxy-4,7-endomethylene-4,7,8,9-tetrahydrophthalan, B.P. 111-121° C./2.4 mm.

Example V

A solution of 10 parts by weight of 2,5-dibenzyloxy-2,5-dihydrofuran and 10 parts of dicyclopentadiene is heated in 25 parts by volume of toluene for 24 hours at 170° C. The toluene and excess dicyclopentadiene are removed by distillation under reduced pressure. The residue is dissolved in 100 parts by volume of pentane and purified by chromatography on alumina to give 1,3-dibenzyloxy - 4,7 - endomethylene - 4,7,8,9-tetrahydrophthalan.

Example VI

| | Percent |
|---|---|
| White beeswax | 8.0 |
| Paraffin | 9.0 |
| Ceresin | 3.0 |
| White mineral oil | 43.0 |
| Borax | 2.0 |
| Water | 34.5 |
| 1,3 - dimethoxy - 4,7-endomethylene hexahydrophthalan | 0.5 |

The borax is dissolved in hot water. The waxes are melted together and the mineral oil is added, the temperature being kept at about 70° C. The borax solution is added with stirring. The mixture is cooled and the phthalan perfume is added with stirring.

Example VII

| 1,3 - dimethoxy - 4,7-endomethylene-hexahydrophthalan | 2.0 |
|---|---|
| Phenylethyl alcohol | 1.0 |
| Benzyl acetate | 1.0 |
| Ethyl alcohol, U.S.P., q.s. | 100.0 |

The hexahydrophthalan is mixed with the phenylethyl alcohol and benzyl acetate, and a sufficient quantity of ethyl alcohol is added to make a 100 ml. solution.

Example VIII

| | Parts |
|---|---|
| Terpineol | 20 |
| Heliotropine | 20 |
| Vanillin | 10 |
| Coumarin | 10 |
| Benzyl acetate | 10 |
| 1,3 - dimethoxy - 4,7 - endomethylenehexahydrophthalan | 5 |
| Synthetic French rose | 5 |
| Tuberose, absolute (liquid) | 5 |
| Jasmine (synthetic) | 15 |
| To make perfume | 100 |

Example IX

| Synthetic French rose | 10 |
|---|---|
| Heliotropine | 10 |
| Cinnamic alcohol | 20 |
| Bergamot oil | 10 |
| Phenylacetaldehyde (50%) | 20 |
| Jasmine (synthetic) | 10 |
| Terpineol | 10 |
| 1,3 - diisopropoxy - 4,7-endomethylene-1,7,8,9-tetrahydrophthalan | 10 |
| To make perfume | 100 |

Example X

| Benzyl acetate | 15 |
|---|---|
| Linalyl acetate | 10 |
| Linalool | 10 |
| Hydroxy-citronellol | 10 |
| Jasmine (absolute) | 5 |
| Phenylethyl alcohol | 10 |
| Rhodinol | 10 |
| Heliotropine | 10 |
| 1,3 - dibenzyloxy-4,7-endomethylene-4,7,8,9-tetrahydrophthalan | 15 |

Benzyl alcohol, sufficient quantity to make perfume _____ 100

What is claimed is:

1. A member selected from the group consisting of compounds of the general formula

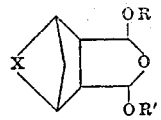

wherein X is a member of group consisting of ethylene and vinylene and R and R' are, interchangeably, members selected from the group consisting of lower alkyl, benzyl and lower alkyl carbonyloxy.

2. 1,3 - di-lower alkoxy - 4,7-endomethylene-4,7,8,9-tetrahydrophthalan.

3. 1,3-di-lower alkyl carbonyloxy-4,7-endomethylene-4,7,8,9-tetrahydrophthalan.

4. 1,3 - di - lower alkoxy-4,7-endomethylene-hexahydrophthalan.

5. 1,3-di-lower alkyl carbonyloxy-4,7-endomethylene-hexahydrophthalan.

6. 1,3 - dimethoxy - 4,7-endomethylene-4,7,8,9-tetrahydrophthalan.

7. 1,3 - dimethoxy - 4,7 - endomethylenehexahydrophthalan.

8. 1,3 - diethoxy - 4,7 - endomethylene-4,7,8,9-tetrahydrophthalan.

9. 1,3 - diisopropoxy - 4,7 - endomethylene - 4,7,8,9-tetrahydrophthalan.

10. 1,3 - dibenzyloxy - 4,7 - endomethylene - 4,7,8,9-tetrahydrophthalan.

References Cited in the file of this patent

Kononov et al.: Chemical Abstracts, vol. 48 (1954), col. 10377e.

Brace: J. Amer. Chem. Soc., vol. 77 (1955), pp. 4157-8.

Hufford et al.: J.A.C.S., vol. 74, pp. 3014-18 (1952).

Norton: Chemical Reviews, vol. 31 (1942), pp. 320-506.